Dec. 30, 1969 R. P. POWERS 3,486,547
PNEUMATIC TIRE
Filed March 8, 1967 2 Sheets-Sheet 1

Dec. 30, 1969  R. P. POWERS  3,486,547
PNEUMATIC TIRE
Filed March 8, 1967  2 Sheets-Sheet 2

United States Patent Office 3,486,547
Patented Dec. 30, 1969

3,486,547
PNEUMATIC TIRE
Robert Pope Powers, Akron, Ohio, assignor to The Firestone Tire & Rubber Company, Akron, Ohio, a corporation of Ohio
Continuation-in-part of application Ser. No. 555,340, June 6, 1966. This application Mar. 8, 1967, Ser. No. 621,690
Int. Cl. B60c *13/00*
U.S. Cl. 152—352
2 Claims

ABSTRACT OF THE DISCLOSURE

This invention relates to a new construction for pneumatic tires. This construction comprises having the area of the sidewalls adjacent the rim edges extending substantially parallel to the axis of rotation of the tire. This overhanging (or cantilever) area of the sidewalls is so adapted that it acts as if it were an inextensible ring.

Summary of the invention

This application is a continuation-in-part of Ser. No. 555,340, filed June 6, 1966; now Patent 3,392,772, issued July 16, 1968.

This invention relates to a new construction for pneumatic tires whereby a vast improvement in ride and handling is obtained. The ride of a tire may be characterized as the esthetics of a tire which the driver and/or passengers feel when riding in the vehicle. It is the tire's ability to absorb the irregularities in the road and not to transmit these irregularities (harshness) to the people riding in the vehicle. It is often characterized as a "softness" in ride; that is, the softer the ride the more irregularities that are absorbed by the tire. The handling of a tire may be characterized as the ability of the tire to react when cornering or maneuvering. The faster and surer a tire responds to steering wheel turning, the better the tire is from a handling or stability viewpoint. This stability is connected to the rigidity of the tire. A tire that is more rigid will respond surer and faster in turning than one that is less rigid and which will, more or less, allow the rim to turn to some extent before the turning is transmitted to the road engaging surface of the tire. The latter type tire is considered loose or sloppy from a handling viewpoint. However, this rigidity that is required to give good stability and handling gives a harsher riding tire and is a drawback from a ride viewpoint. The tire of prior art has been a compromise of these two characteristics and not the optimum of either. The tire design engineers are aware of many ways to increase either one of these characteristics, but are always plagued with a decrease in the other characteristic.

The inventor accomplishes the goals of good handling and good ride characteristics by constructing the tire of the invention so that the area of the sidewalls adjacent the axially outer rim edges extends substantially parallel to the axis of rotation of the tire. This overhanging or cantilever area of the sidewalls must be so constructed that it reacts essentially like an inextensible band or hoop to stabilize the area. This stabilizing band or hoop is adapted to be able to be movable in a plane perpendicular to the axis of rotation of the tire and to be compressible in a radially inwardly direction but inextensible in a radially outward direction. The inextensible stabilizer band enables the overhanging area of the sidewalls adjacent the rim edges to resist any lateral distortion as the tire goes through a turn. The tire responds as if it had a rim width equal to the sum of the actual rim width plus the tire overhanging sidewall areas. Also due to the radial compressibility and mobility of the inextensible stabilizer band, the ride characteristics of the tire are not adversely effected. These relationships will be explained in greater detail in reference to the drawings.

It is understood that the closer the road engaging surface is to the tire rim (the smaller the section height of the tire), the better handling the tire will be. This is due to the fact that there is less looseness or slip between the road engaging surface and the rim, which results in better response to turning the tire and a more stable tire. However, when the road engaging surface is closer to the rim, the harshness of the ride of the tire is increased.

This principle is employed in the present trend to "lower profile" or "squattier" tires such as the present racing tires and high performance tires (Firestone Wide Oval). These tires with section height to section width ratios in the range of 40% to 75% (as opposed to the conventional passenger tires of 80% to 100%) give the much improved handling but a harsher ride.

The construction of this invention is particularly well adapted to the "low profile" type of construction with the section height to section width ratio between 25% and 75%. Due to the critical feature of this invention that the area of the sidewalls adjacent the rim edges must be substantially parallel to the axis of rotation of the tire, the tire of this invention is adapted to fit on a rim that has a width significantly less than the tire's maximum section width, usually in the range of 25% to 75% of the said maximum tire section width. This new construction enables the low profile tire to have the good ride characteristics of the present conventional tire and not lose the good handling characteristics of the low profile, racing or high performance tire.

This new construction may be utilized in all types of tires, that is, passenger, truck, tractor, off-the-road, airplane, racing, industrial, etc. It may also be used with either a radial, semi-radial or conventional bias body construction.

An object of this invention is to provide a pneumatic tire with both ride and handling characteristics that approach the optimum of each of these features without detracting from the other.

Other objectives of this invention will be apparent from the drawings and description.

The tire of this invention has the area of the sidewalls adjacent the axially outer edges of the rim extend in a direction *substantially parallel* to the axis of rotation of the tire. This overhanging (cantilever) area of the sidewalls must be so constructed that it forms an inextensible ring. This ring must be able to move in a plane perpendicular to the axis of rotation of the tire and be compressible in a radially inwardly direction but inextensible in a radially outwardly direction. The inextensible rings must restrict the axial folding over of the sidewall when the tire undergoes cornering stresses to give the required handling characteristics and yet be radially inwardly flexible to give the required ride characteristics.

The stabilizing bands or members in the overhanging area of the sidewalls adjacent the rim edges may be composed of various materials and combinations thereof, as long as the bands react in the proper way by being radially inwardly compressible and radially outwardly inextensible. The bands may be built internally in the sidewalls of the tire, may be attached either wholly or partly integral to the interior of the tire when cured or may be completely non-integral with the tire when cured.

Figure 1:
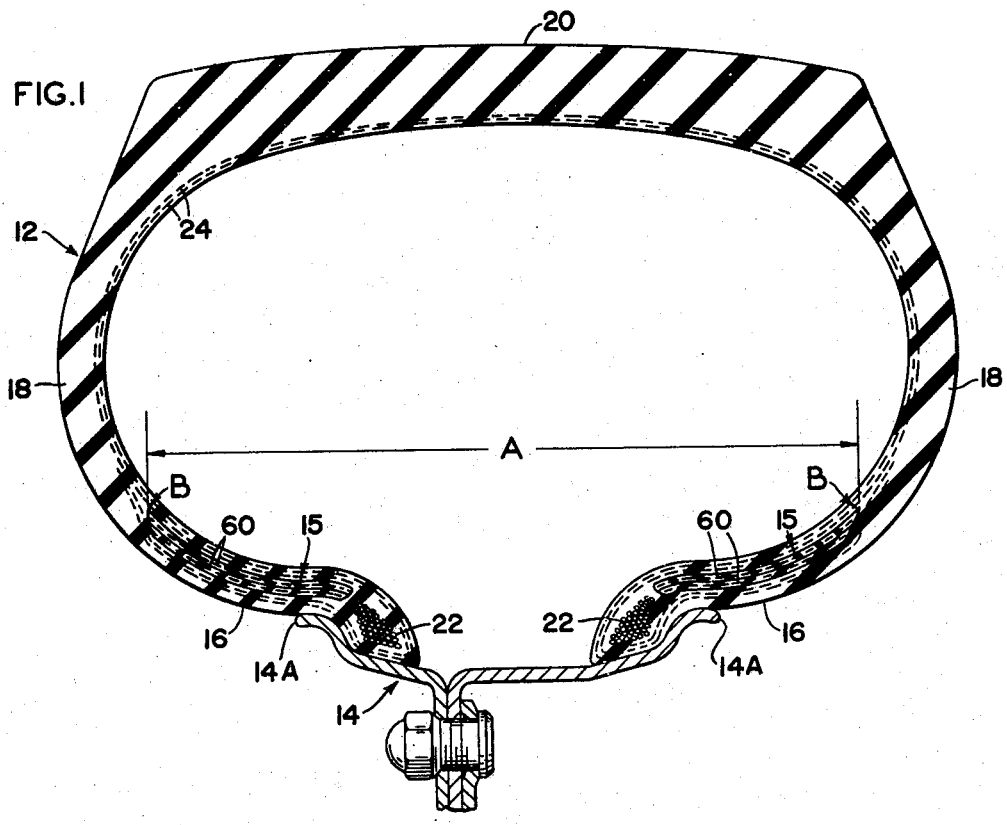
FIGURE 1 is a cross-sectional view of the tire of this invention mounted on a rim. The overhanging area of the sidewalls are reinforced by a stabilizer member internally built in the sidewalls.

Referring to FIGURE 1, the tire 12 is comprised of sidewalls 18, 18 tread portion 20, and annular beads 22, 22. Suitable body plies 24 are provided for the necessary reinforcement of the tire and consist of cords which may be of any suitable material and may extend in a radial direction or at a bias angle from bead to bead. The tire is shown mounted on rim 14 with the overhanging (or cantilever) area of the sidewalls shown at 16, 16. These overhanging areas adjacent the axially outer rim edges, 14A, 14A, are constructed so that they extend substantially parallel to the axis of rotation of the tire. Due to this construction feature, the rim width would be less than the maximum section width of the tire and therefore, only a fraction of the tire section width, preferably within the range of 25% to 75%. The profile of the tire of this invention (section height to section width ratio) is preferably of the low profile type and within the range of 25% to 75%.

The overhanging area of the sidewalls is substantially parallel to the axis of rotation of the tire. These overhanging areas of the sidewalls are reinforced with stabilizing members 15, 15, that form inextensible rings or hoops in the areas. As stated above, the members give these areas lateral stability when turning thus providing better handling. When cornering, the tire reacts as if it had a rim width equal to the actual rim width plus the stabilized area of the overhanging sidewalls, represented approximately by distance A in FIGURE 1. The tire sidewall on cornering only tends to overlap upon itself to approximately points B and is stabilized to resist lateral distortion from points B to the rim edges. These rings also are compressible in a radially inwardly direction so that upon deflection in this direction they give, thereby resulting in good ride characteristics. There is no radially inward rigidity, as a wider rim would have, to give the harsh ride that usually accompanies a low profile, high performance type tire.

Figure 2:
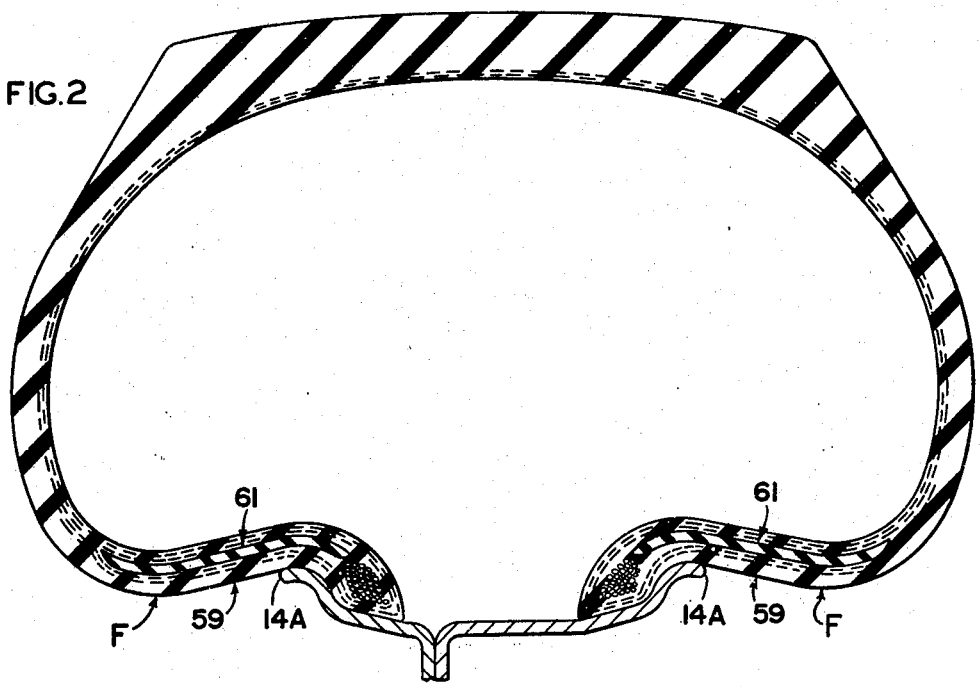
FIGURE 2 is a cross-sectional view showing a variation of the profile of the overhanging area of the sidewalls of the tire of this invention mounted on a rim. Another embodiment of the stabilizer members internally built in the sidewalls is shown.

The stabilizing members in FIGURE 1 are shown as being built internally in the sidewalls of the tire and are comprised of bands 15, 15, of rubbery material having a plurality of reinforcing cords, 60. These cords may be any of the standard tire reinforcing cords, the synthetics cords such as rayon, nylon, polyesters, combinations or blends of the foregoing and the inextensible cords such as wire, fiberglass, etc. The bands are shown as two layers of the rubbery cord reinforced material with the cord angle in one layer at substantially 90 degrees to the cord angle in the other layer. The cords may also extend in a nearly circumferential direction to provide the necessary resistance to the lateral distorting influences; suitable angles are in the range of 50-75° to the axial center-line of the tire. It is contemplated that only one layer of cord reinforced rubbery material may be used. The stabilizing bands may also be formed of a hard, high-modulus rubber strip, with or without cord reinforcement and is generally characterized as one having a Shore A Durometer hardness of at least 70 and preferably 75 to 85 and a modulus of elasticity at 100% elongation of at least 500 p.s.i. This type rubber compound is well known in the art. The strip may be in the form of a bead filler or the like. FIGURE 2 shows such a strip, 61, 61. The strip must be inextensible to a degree to provide the necessary resistance to lateral forces in the overhanging area of the sidewalls.

Figure 3:
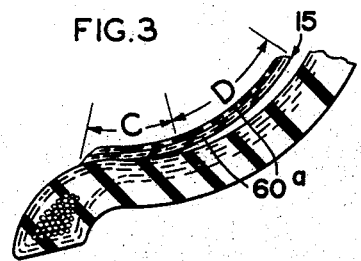
FIGURES 3, 4, 5 and 6 are fragmentary sectional views showing the overhanging area of a sidewall of the tire of this invention. These figures show other embodiments of the stabilizer member in this sidewall area.
Figure 4:
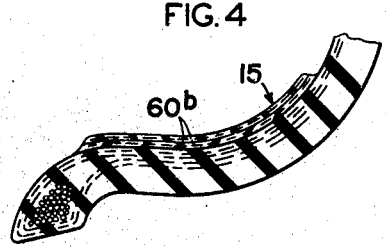

The stabilizing bands may also be cured integral with the tire on the interior of the tire sidewalls in the overhanging area. The bands may be either wholly cured or partially cured to the interior of the sidewalls. FIGURE 3 shows this embodiment partially cured to the sidewall's interior; FIGURE 4 shows this embodiment wholly cured to the sidewall's interior. In both of these figures, the stabilizer band, 15 is shown as two layers of rubbery material having a plurality of reinforcing cords (60a in FIG. 3 and 60b in FIG. 4). These cords may be any of the synthetic cords or inextensible cords defined in reference to FIG. 1 This type of stabilizing band may also be formed as a strip of hard, high-modulus rubber stock, with or without cord reinforcement.

In building this embodiment when the band is cured wholly integral with the tire sidewall as in FIG. 4, the band is merely placed on the tire building drum prior to the placing, and immediately adjacent to, the first ply of the tire body or inner liner, if present. When the band is cured only partially integral to the sidewall, as in FIG. 3, the band is set on the building drum, a sheet of material is placed over the area of the band that is not to be cured integral with the tire, and then the first ply of the tire body or the inner liner, if present, is placed on the building drum. This sheet of material is non-compatible with the rubber stock, such as polyethylene, and therefore will not become integral with the rubber stocks during curing. Thusly, after the tire is cured, this sheet may be stripped out of the tire thereby leaving the construction shown in FIG. 3. Referring to this figure, the distance C is the area which did not have the incompatible sheet between the band and the sidewall and the area D is the area in which the incompatible sidewall material was placed between the band and the sidewall.

Figure 5:
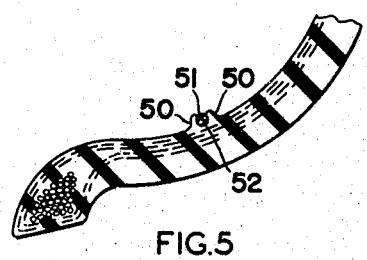
Figure 6:
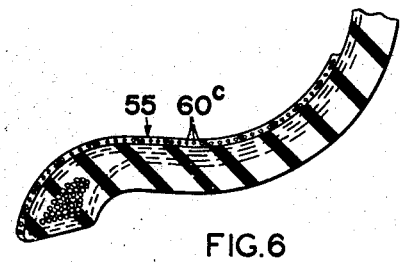

The stabilizer band may also be wholly non-integral with the tire when the tire is cured. Examples of this are shown in FIGURES 5 and 6. In these embodiments the stabilizer bands are assembled with the tire after the curing of the tire. In FIGURE 5, the embodiment shows the interior of the sidewall being molded with ribs 50, 50 to form groove 51. Placed in groove 51 is an annular inextensible hoop 52 adapted to fit snugly in this groove. This hoop may be comprised of wire, fiberglass, or other material exhibiting inextensible characteristics. In this embodiment, the lateral distorting forces will be resisted by the hoop 52 to give good handling and the radially inwardly distorting forces will not be significantly resisted due to the compressibility of the hoop, thereby giving good ride.

FIGURE 6 is another embodiment of the non-integral type of stabilizer band. It shows a band, 55, which may be comprised of rubbery material having a plurality of reinforcing cords, 60c. This type band is the same as that defined relative FIG. 1. It is shown with circumferentially extending reinforcing cords. It must be separately cured into an inextensible annular hoop before being located adjacent the interior of the overhanging area of the sidewalls of the tire. This type of stabilizing member may also be formed of a pre-cured annular hoop of a hard, high-modulus rubber compound, with or without cord reinforcement, or of a resinous material that exhibits the necessary resistance to lateral forces. It is understood that it may be necessary to have a bead locking device or a safety device as disclosed in the parent case, Ser. No. 555,340, to hold the stabilizing member in its proper location.

The overhanging area of the sidewalls may have the configuration as shown in FIGURE 1. It also may be of the configuration shown in FIGURE 2 or FIGURE 7. The overhanging area of the sidewall adjacent the rim edges must be substantially parallel to the axis of rotation of the tire. Either FIG. 1 or FIG. 2 or FIG. 7 meet this requirement. It is noted in FIG. 2 the sidewall actually has a smaller diameter in reference to the axis of rotation of the tire than the rim. In FIG. 2 the tire, 12, is comprised of sidewalls 18, 18, tread portion 20 and annular beads 22, 22. Suitable body plies 24 are provided for the necessary reinforcement of the tire and consist of cords which may be of any suitable material and may extend in a radial direction or at a bias angle from bead to bead. The overhanging area of the sidewalls is shown as 59, 59, with the distance from the axis of rotation to point F of the sidewall being less than the distance from said axis to the edge of the rim 14, edge 14A.

Figure 7:
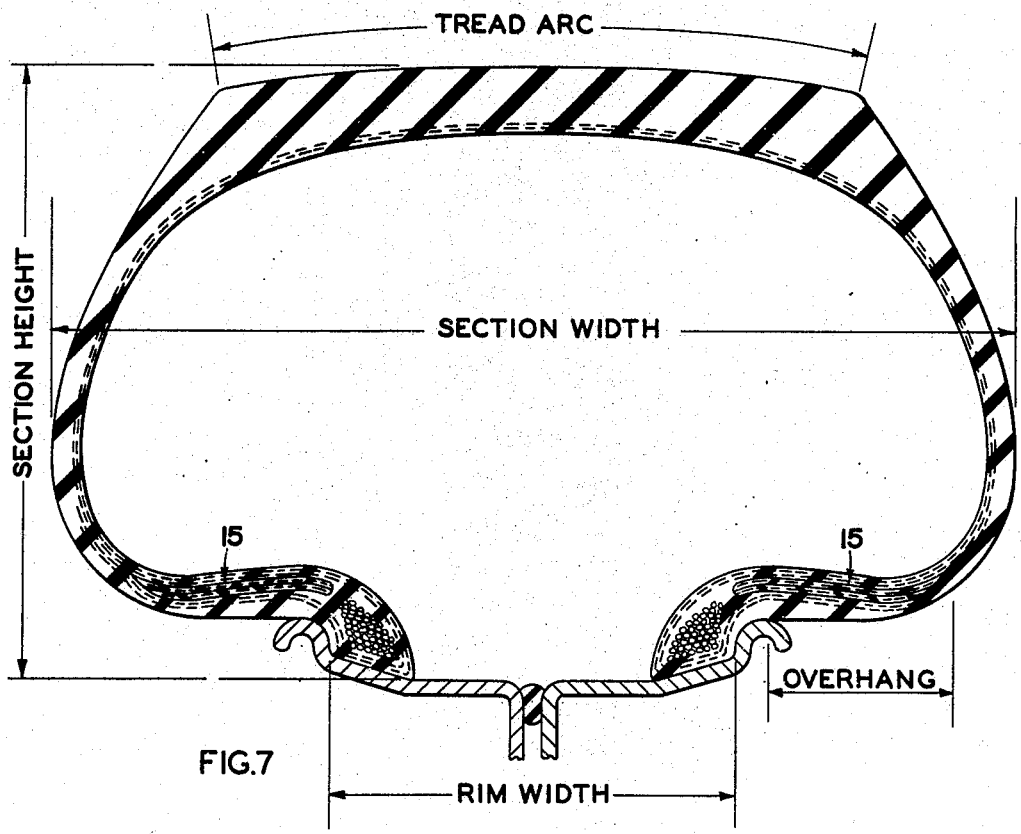
FIGURE 7 is a cross-sectional view of a specific example of the tire of this invention in combination with a rim showing still another overhanging sidewall profile.

FIGURE 7 shows a specific example of the tire and rim combination of this invention. This specific example is designated as a 8.70–16 tire which is recommended to replace the present standard 7.75–14 passenger tire. The stabilizing members in the overhanging sidewall portions are shown as 15, 15. The specific dimensions of this 8.70–16 are as follows:

|  | Inches |
|---|---|
| Tread arc width | 5.97 |
| Maximum section width | 8.96 |
| Maximum section height | 5.50 |
| Overhanging area of sidewall | 1.75 |
| Bead diameter | 16 |

These dimensions were obtained on the tire when it was inflated to standard pressure on a tire rim having a 16 inch diameter and a 3.688 inch width. The section height to section width ratio of this tire is approximately 61%. The rim width to section with ratio of the combination is approximately 41%. The rim base in this example has a 15° taper. It is understood the taper of the rim base may be anywhere from 0° to 20° in relation to the axis of rotation of the rim.

The above mentioned drawings and descriptions are, by way of example, to show different ways of obtaining the new tire construction of this invention. Other ways are also within the scope of this invention so long as they meet the principle of this invention; that is, a tire in which the area of the sidewalls adjacent the axially outer rim edges extends substantially parallel to the axis of rotation of the tire and this "overhanging" area of the sidewalls is provided with some means of resisting lateral distortion caused by cornering forces when the tire is turned. This overhanging area of the sidewalls must also be radially inwardly compressible when exposed to radially inwardly directed forces to permit a sufficient cushioning to give a "soft" ride. It is noted that this type construction also necessitates that the rim width be substantially less than the maximum section width of the tire and this construction is particularly well adaptable for the low profile, high performance type tires. With this construction in the low profile tire, the inheriently good handling characteristics are retained and good riding characteristics are obtained by the overhanging area of the sidewalls which are unsupported by the rim and not thereby restricted to radially inwardly compression absorbing the harshness of the ride caused by the low profile of the tire.

It is also contemplated that the stabilizing member in each overhanging portion of the sidewalls may be of a different construction; that is, one sidewall may have a stabilizing member of a hard, high-modulus rubber compound strip and the other sidewall have a stabilizing member of rubbery material with reinforcing cords embedded therein, or other such combinations.

The tire of this invention may, of course, be used in combination with a safety device for run flat purposes. It is particularly well adapted to use the safety device and rim disclosed in the parent application, Ser. No. 555,340, filed June 6, 1966.

The tire of this invention also enables a much larger rim diameter for a comparable size tire. Therefore, room for larger brakes and better suspension systems is available to automobile manufacturers.

Various other modifications of this construction may occur to those skilled in the art without departing from the scope of this invention.

I claim:

1. In combination a rim having rim flanges and a pneumatic tire having a tread portion, sidewalls extending from the tread portion and terminating in annular beads seated on said rim, said rim having a width substantially less than the tire section width, said tire having a substantial portion of each of its sidewalls extending axially outwardly from said rim flanges in a direction substantially parallel to the axis of rotation of said tire and being unsupported by said rim, said sidewall portions being stabilized by stabilizer members, said stabilizer members comprirsed of a layer of hard, high modulus rubber compound having a Shore A Durometer of at least 70 and a modulus of elasticity at 100% elongation of at least 500 p.s.i. and extending from a point axially inwardly of said rim flanges to a point axially outwardly of said rim flanges and located internally of said sidewall portions.

2. In combination a rim having rim flanges and a pneumatic tire having a tread portion, sidewalls extending from the tread portion and terminating in annular beads seated on said rim, said rim having a width substantially less than the tire section width, said tire having a substantial portion of each of its sidewalls extending axially outwardly from said rim flanges in a direction substantially parallel to the axis of rotation of said tire and being unsupported by said rim, said sidewall portions being stabilized by stabilizer members, said stabilizer members comprised of a layer of a hard, high modulus rubber compound having a Shore A Durometer of at least 70 and a modulus of elasticity at 100% elongation of at least 500 p.s.i. and extending from a point axially inwardly of said rim flanges to a point axially outwardly of said rim flanges and located adjacent the interior of said sidewall portions and non-integral with said sidewall portions.

References Cited

UNITED STATES PATENTS

| 803,345 | 10/1905 | Jeffery | 152—352 |
|---|---|---|---|
| 815,430 | 3/1906 | Jeffery | 152—352 |
| 3,232,331 | 2/1966 | Cappa et al. | 152—354 |
| 3,253,636 | 5/1966 | Travers | 152—354 |

ARTHUR L. LA POINT, Primary Examiner

C. B. LYON, Assistant Examiner

U.S. Cl. X.R.

152—354